United States Patent
Loveland

[11] 3,876,739
[45] Apr. 8, 1975

[54] METHOD OF APPLYING A RIGID POLYURETHANE FOAM TO THE EXTERIOR OF A RAILWAY CAR

[75] Inventor: Arthur F. Loveland, Sarasota, Fla.

[73] Assignee: ACF Industries, Incorporated, New York, N.Y.

[22] Filed: July 16, 1973

[21] Appl. No.: 379,696

Related U.S. Application Data
[63] Continuation-in-part of Ser. No. 139,903, May 3, 1971, abandoned, which is a continuation of Ser. No. 829,549, June 2, 1969, abandoned.

[52] U.S. Cl. ............... 264/46.4; 105/247; 105/358; 264/33
[51] Int. Cl. ................... B29d 27/04; B61d 5/04
[58] Field of Search ................. 264/45, 33

[56] References Cited
UNITED STATES PATENTS

| | | | |
|---|---|---|---|
| 2,654,935 | 10/1953 | Ager | 264/33 X |
| 2,810,180 | 10/1957 | Barnack | 264/33 X |
| 2,893,098 | 7/1959 | Tilley | 264/33 X |
| 3,144,701 | 8/1964 | Bowden | 264/45 X |
| 3,152,198 | 10/1964 | Williams | 264/33 |
| 3,187,069 | 6/1965 | Pincus et al. | 264/45 |
| 3,245,648 | 4/1966 | Johanssen et al. | 264/33 X |
| 3,328,496 | 6/1967 | Graves | 264/45 |
| 3,392,220 | 7/1968 | Jennings | 264/45 |
| 3,490,387 | 1/1970 | Halcomb | 105/248 |
| 3,548,453 | 12/1970 | Garis | 264/45 X |

Primary Examiner—H. S. Cockeram
Attorney, Agent, or Firm—Henry W. Cummings

[57] ABSTRACT

A method of applying a rigid polyurethane foam to the exterior of a railway car, particularly a covered hopper railway car or a tank car to provide a smooth and even outer surface and appearance. A plastic or metal sheet is first applied to the interior of a mold and the mold is then secured to the car spaced about three inches from the sides of the car. A foamed cellular plastic, such as a polyurethane foam formed as a reaction product of organic polyisocyanate and a polyester or polyether, is introduced into the space or cavity between the mold and the outer surface of the side sheets. After the foaming reaction has taken place and the foam has filled the cavity, the mold may be removed and moved to an adjacent area for foaming. The outer surface of the car thus foamed is even and smooth to facilitate painting and stenciling.

6 Claims, 10 Drawing Figures

METHOD OF APPLYING A RIGID POLYURETHANE FOAM TO THE EXTERIOR OF A RAILWAY CAR

CROSS REFERENCE TO RELATED APPLICATION

This application is a continuation-in-part of application Ser. No. 139,903, filed May 3, 1971, which is a continuation of application Ser. No. 829,549, filed June 2, 1969, both now abandoned.

BACKGROUND OF THE INVENTION

Heretofore, railway cars, such as covered hopper railway cars, have been provided with a layer of rigid polyurethane foam material on the outer surface of the car including the sides of the car. The reactants forming the components of the foam material have been sprayed onto the outer surface of the railway car and the foam has then expanded to form between around 2 to 4 inches of insulation on the outer surface of the railway car. However, the outer surface of the foam insulation thus formed has been uneven and has presented painting and stenciling difficulties in addition to an ungainly appearance. Further, when applying foam by spraying onto the outer surface of the car, the thickness of the foam insulation varies from area to area and is largely dependent on the skill of the workmen applying the foam reactants. Heat loss areas may thus be formed by insulation of insufficient thickness.

SUMMARY OF THE INVENTION

The present invention employs an outer shell mold which is of a contour identical to the desired outer contour of the rigid foam layer on the sides of the railway car. As the appearance of the car is obtained primarily from the sides of the car and practically all stenciling is accomplished on the sides of the car, the mold comprising the present invention is particularly adapted for foam insulating the sides of the car. A mold is releasably secured to the car adjacent one side and is spaced from the side a distance equal to the desired thickness of the foam insulation thereby to form a cavity for introducing the foam reactants. In the case of a covered hopper car the mold is affixed to the side sill and side plate. In the case of a tank car the mold is affixed at its upper and lower portions to a jig which extends around the other half of the tank car. The inner surface of the mold has a sheet formed of a suitable material such as light gauge aluminum, steel or plastic. A sheet thickness between around 1/16 inch and 1/64 inch will function satisfactorily. The foam reactants are then introduced into the cavity formed between the mold and adjacent side of the car. The material foams and hardens into a cellular core of rigid foam material having a uniform density. The foam material adheres to the sheet on the inner surface of the mold and the mold is removed leaving the sheet in place on the outer surface of the foam material to form a hard, smooth surface which has wear resistant properties and forms a protecting coating for the foam material. The outer surface of the sheet may be easily painted or stenciled. In the event it is desired not to have a separate thin outer sheet on the outer surface of the foam insulation, a coating compound, such as wax, may be coated on the inner facing surface of the mold sheet to prevent adherence of the foam material thereto. Thus, the outer sheet is removed with the mold and leaves the foam insulation with a smooth outer surface having a uniform thickness. The foam material may then be painted and stenciled.

THE DRAWINGS

Corresponding reference characters indicate corresponding parts throughout the several views of the drawings.

Figure 1:
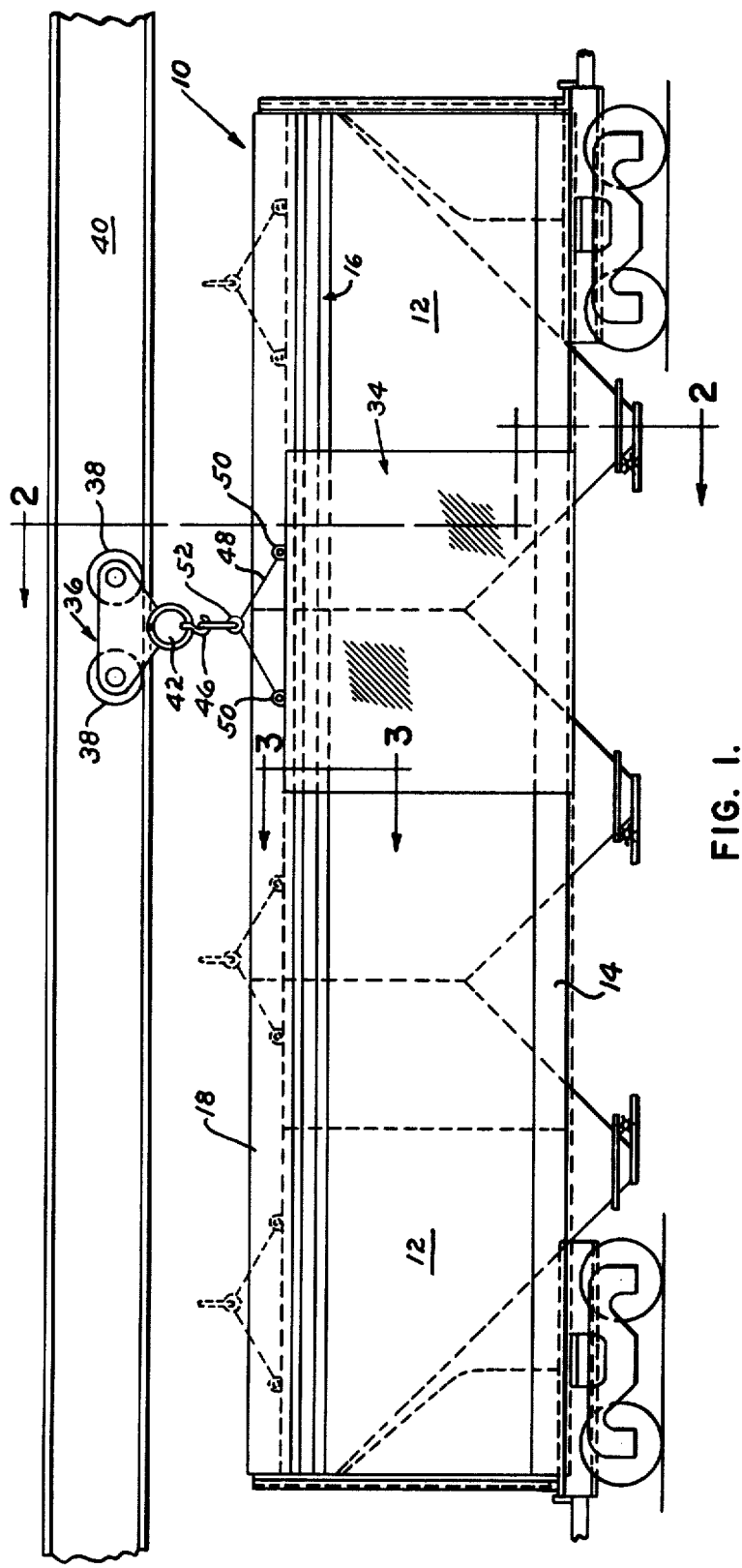
FIG. 1 is a side elevation of a covered hopper railway car illustrating foam insulation being applied to the exterior surface of the sides of the car.
Figure 2:
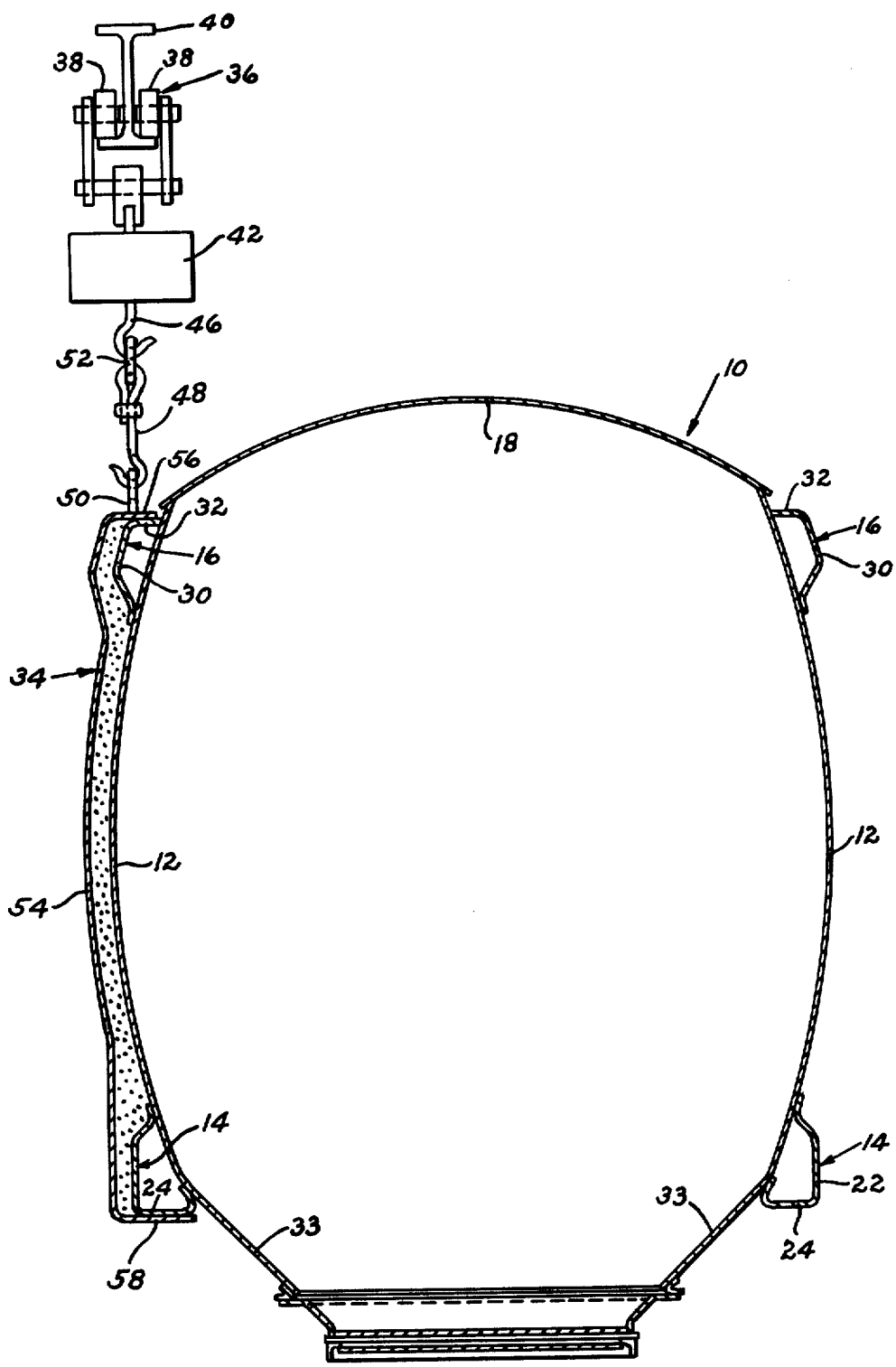
FIG. 2 is a transverse section taken generally along line 2—2 of FIG. 1 and illustrating a mold in position adjacent the side of the railway car.

Referring now to the drawings for a better understanding of the invention, a covered hopper railway car is generally indicated 10 having side sheets 12. Side sills generally indicated 14 extend along the lower marginal portions of the side sheets 12 and side plates generally indicated 16 extend along the upper marginal portions of side sheets 12. A roof 18 is secured between side sheets 12. Side sill 14 comprises a web 22 and a lower leg 24. Side plates 16 includes a web 30 and upper leg 32. Hopper slope sheets 33 extend downwardly from side sills 14 at each of the bottom discharge hoppers.

A mold indicated generally at 34 is adapted for positioning at intervals along side sheets 12 for foam insulating the sides of railway car 10. To position and support mold 34 on side sheets 12, a trolley generally indicated 36 has rollers 38 mounted for movement along the lower flange of I-beam support 40. A winch motor 42 is carried by trolley 36 and includes a retractable chain with a hook 46 on its lower end. A cable 48 has hooks on its ends received within eyes 50 on mold 34. A ring 52 fixed to cable 48 is engaged by hook 46 for lifting and movement of mold 34 along the side sheets 12.

Mold 34 includes a generally vertical web 54, an upper generally horizontal leg 56, and a lower generally horizontal leg 58. End closure strips 60 are tack welded to the side edges of web 54. Strips 60 may be removed from mold 34 by chipping away or removing the tack welds. For example, the first foam pouring on a side of railway car 10 would require two end closure strips 60. Subsequent pourings would require only a single end closure strip 60 as an adjacent edge of the rigid foam would form one closure. An inner liner 63 is positioned on the inner face of mold 34 to form an outer smooth surface for the foam insulating material. Liner 63 may be of a light gauge aluminum, steel, or plastic, such as between 1/16 and 1/64 inch in thickness.

Figure 4:
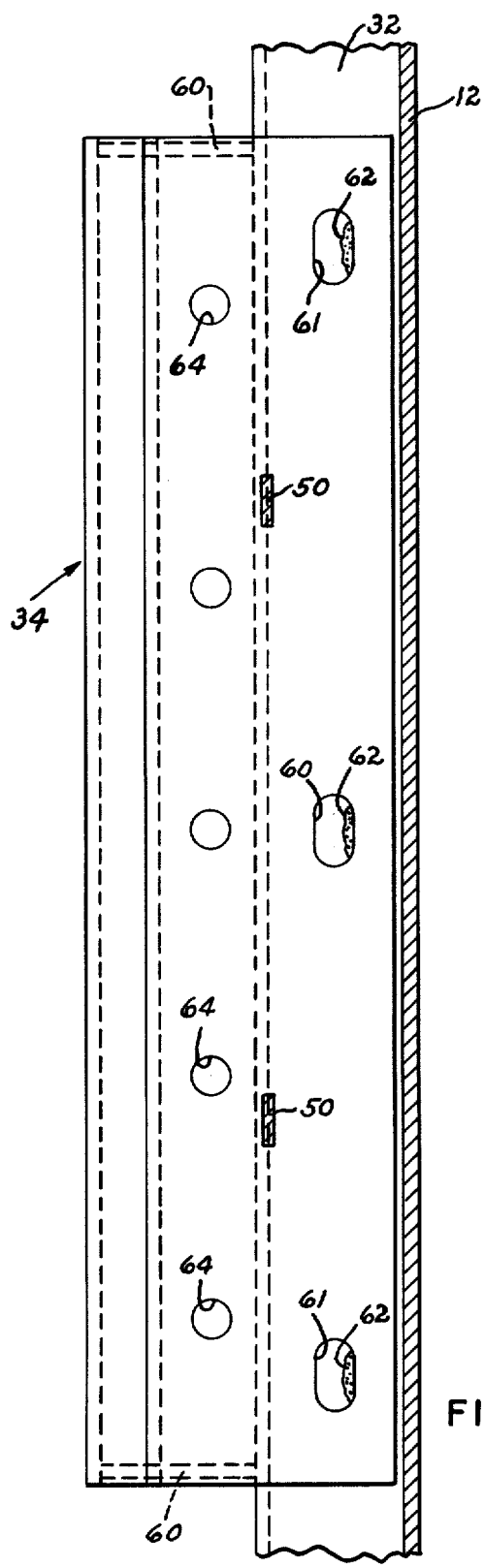
FIG. 4 is a top plan looking generally along line 4—4 of FIG. 3.
Figure 3:
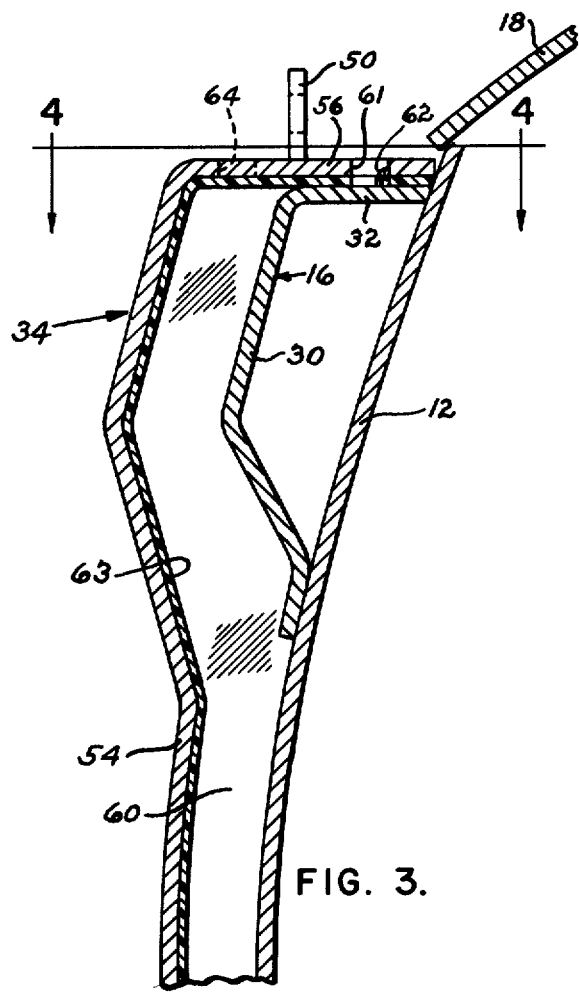
FIG. 3 is an enlarged section taken generally along line 3—3 of FIG. 2.
Figure 5:
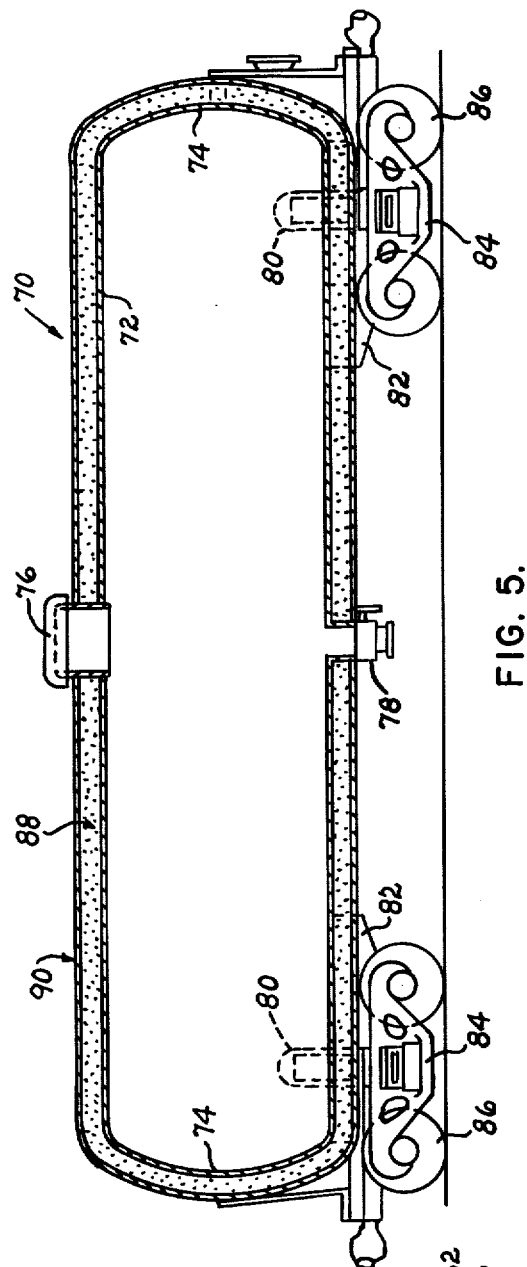
FIG. 5 is a view of a tank car having the foamed-in-place insulation method of the present invention.

To position mold 34, upper leg 56 is positioned over leg 32 of side plate 16 and lower leg 58 is positioned beneath leg 24 of side sill 14. Legs 56 and 58 have elongate slots 61 therein as illustrated in FIG. 4. Legs 56 and 58 are tack welded at 62 within slots 61 to respective legs 32 and 24 thereby to secure mold 34 to side plate 16 and side sill 14. In this position, liquid foam reactants are introduced within mold 34 by suitable hoses (not shown) extending through openings 64 in leg 56 of mold 34. A suitable foam material is a polyurethane foam with a closed cell structure. Polyurethane foams have a high load-bearing capacity, do not deteriorate, and form good heat insulators. Polyurethane foams may be formed from reaction compositions of polyisocynate and a polyester or polyether, and a catalyst. A volatile liquid such as Freon, a diclorodifluoro methane, would provide a foaming agent.

The polyurethane material expands to fill the space within mold 34. As the expanded resin cures and hardens, it adheres firmly to the surfaces of the side sheet 12 and the liner 63. After the polyurethane material has cured and hardened, the tack welds 62 on legs 32 and 24 may be chipped off by a suitable tool and mold 34 removed. Liner 63 remains secured to the polyurethane material and forms a smooth hard outer surface for painting or stenciling. Mold 34 may then be positioned at an adjacent position for the subsequent pouring of additional polyurethane foam material along another section of the side sheets 12.

In accordance with another embodiment of the present invention, a tank car can have a rigid polyurethane foam applied to the exterior to provide a smooth and even outer surface and appearance. When required, the tank cars can be foamed as shown in FIGS. 5 through 8, to provide a smooth outer surface to facilitate painting and stenciling.

Referring now to the drawings, a tank car is generally indicated at 70. Tank car 70 has a shell 72, tank heads 74, a dome structure 76 and an outlet arrangement 78. The tank 70 is mounted on bolster saddles 80 and the entire tank assembly is then mounted on stub center sills 82. Trucks 84 and wheels 86 complete the assembly.

The completed foaming of tank car 70 is indicated generally at 88 and the plastic or metal outer sheet is indicated generally at 90.

Figure 6A:
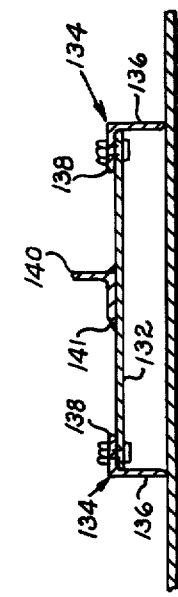
FIG. 6A is a sectional view taken generally along line 6A—6A of FIG. 6.
Figure 6B:
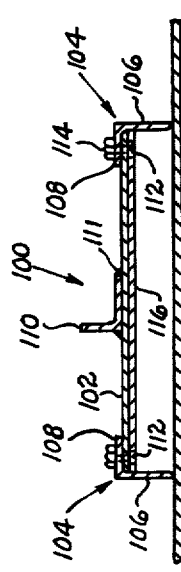
FIG. 6B is a sectional view taken generally along line 6B—6B of FIG. 6.
Figure 6:
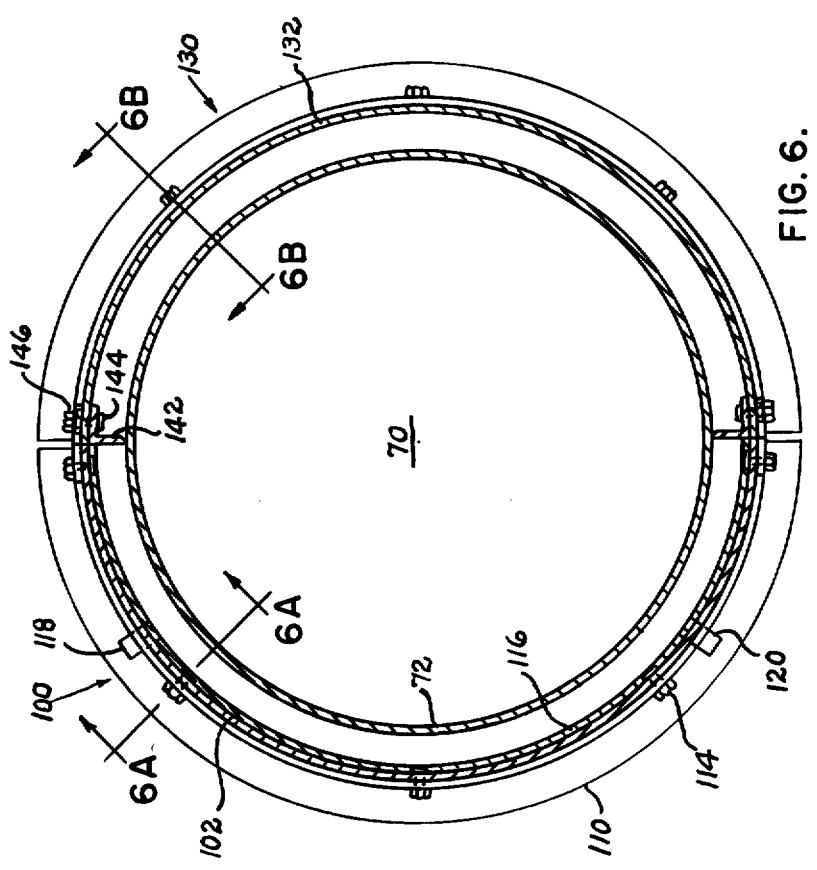
FIG. 6 is a sectional view illustrating the application of the foam insulation to one side of the car.

As shown in FIG. 6, the tank car shell 72 is being foamed. A mold 100 comprises an outer sheet 102 and angles 104 formed to fit the contour of the tank 70. Downward turned legs 106 of angles 104 can be of sufficient length to give required foam thickness. Upper legs 108 of angles 104 are bolted to sheet 102 forming a hollow mold 100 as shown in FIG. 6A. The sections of mold may be of any convenient length, preferably not over about 6 feet and adapted for positioning along sides of tank car 70 by appropriate handling equipment i.e. cranes, trolleys, etc. The mold can also have a stiffening angle 110 formed and tack welded to outer surface of sheet 102 as shown in FIG. 6 at 111. Angles 104 are bolted to sheet 102 with flat headed bolts 112 having the heads on the inner surface of the sheets 102 and nuts 114 on the outer surface of angle leg 108.

The entire inner surface of the mold 100 is next sprayed or painted with a release agent which will free it from the car after foaming has been completed. Before the mold 100 is placed on tank car 70, an inner liner 116 may be positioned on the inner face of mold 100 to form an outer smooth surface for the foam insulating material and also a smooth surface to facilitate painting and stenciling. Foaming reactants are introduced through openings 118 and 120. The enclosed ends of mold 100 meet at the vertical center line of the cylindrical tank 70, as shown in FIG. 6. A jig 130 is now constructed similar in shape and size to mold 100 and is applied on the opposite side of the car from mold 100 as shown in FIG. 6. The jig comprises an outer sheet 132 and angles 134 formed to fit the contour of tank 70. Downwardly turned legs 136 of angles 134 are preferably of same length as legs 106 of angles 104. Upper legs 138 of angle 134 are bolted to sheets 132 as shown in FIGS. 6B. The jig can also have a stiffening angle 140 formed and tack welded at 141 to outer surface of sheet 132.

Figure 7:
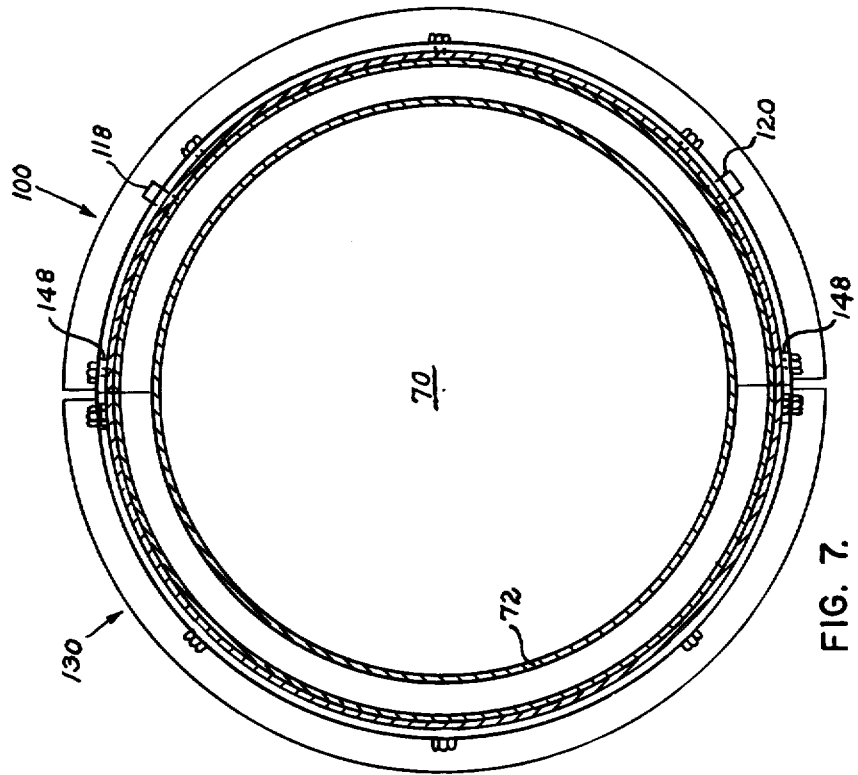
FIG. 7 is a view of the application of the foam insulation to the opposite side of the tank car.

The ends of jig 130 are now closed with angles 142 by bolts 144 and nuts 146 as shown in FIG. 6. The outer surface of angle legs 142 is preferably sprayed or painted with a releasing agent at time of positioning for foaming. Clamps or metal clips 148 shown in FIG. 7 hold the jig 130 and mold 100 in tight contact with the tank 70 when foaming. As shown in FIG. 7, tank car 70 has been foamed on its left side. The mold 100 has been positioned on the right side of car 70 and the jig with its end closure angles 142 removed has been positioned on the left side of car 70. Clamps or metal clips 148 are secured and foaming reactants are introduced in openings 118 and 120, completing an area of foaming on both sides of the car.

To continue foaming the car, the jig 130 and mold 100 are moved longitudinally and by removing one angle leg on the mating side of the foamed car, they can overlap the foamed surface and by reclamping they are in position to continue the foaming.

Figure 8:
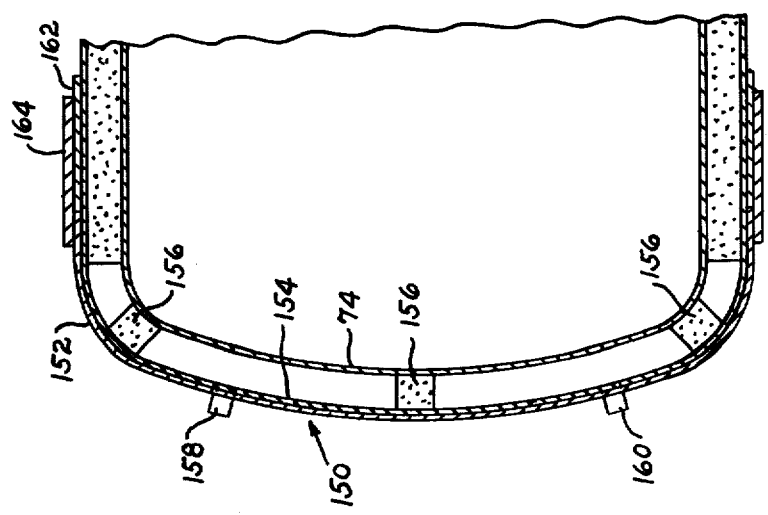
FIG. 8 is a side view illustrating the application of the foam insulation to the end portion of the tank car.

For ends of the car, an end mold 150 as shown in FIG. 8 is utilized. End mold 150 comprises a formed head 152 which will allow essentially the same thickness of foam as the jig and mold allow. The mold 150 may be lined with an inner liner 154. To help position mold 150 and assure the foaming thickness, several inserts of foam 156 can be applied to head 74. Inserts 156 can be sanded to the same outer surface dimension as the mold. The foaming reactants are introduced through openings 158 and 160. Mold 150 is affixed by means of fasteners 162 and 164 to the previously solidified foam portion. After the foaming reaction has taken place, mold 150 is removed leaving liner 154 and the foam in place.

The present method is not to be considered conclusive as variations can be used. Jigs and molds may be fabricated to paint a specific area, for example, to fit around the dome and outlet structures. Also, jigs and molds to fit the bolster structures may also be provided. The basic operation is the same.

What is claimed is:

1. A method of applying a layer of rigid insulating foam material to the exterior surface of a railway tank car comprising in a first step:
   releasably securing a jig on a first exterior side of the car;
   releasably securing an outer shell mold to the exterior of a second side of the car, said mold being affixed at its upper and lower portions to said jig;
   said mold having a horizontal dimension considerably less than the length of the car, and a vertical contour conforming to the shape of the car and identical to the desired contour of the desired foam layer;

the inner surface of said mold being provided with a liner sheet;

introducing foam reactants into the compartment defined by said lined mold and the side of said car;

allowing said foam material to foam and harden;

removing said mold, leaving said hardened foam material adhering to the side of said car and said sheet adhering to the outer surface of said hardened foam material;

in a second step releasing said mold and said jig to realign said mold and a fresh liner as in the first step;

filling, molding and hardening as in the first step, and repeating said foregoing steps as required to cover said car with liner-covered hardened foam material adhered to said car.

2. A method according to claim 1 wherein a mold is secured in spaced relation to the end portions of the tank and foam reactants are introduced into the cavity defined by the respective end portions and the mold to form an insulating layer on the outer surface of the end portions of the tank.

3. A method according to claim 1 wherein the liner is made from a material selected from the group consisting of aluminum, steel and plastic.

4. A method according to claim 3 wherein the liner has a thickness of between about 1/16 inch and about 1/64 inch.

5. A method of applying in situ a layer of an insulating polyurethane foam material to the exterior surface of a covered hopper railway car having side sheets, side sills along the lower marginal portions of the side sheets, and side plate members along the upper marginal portions of the side sheets; the steps comprising: applying a liner of between around 1/16 inch and 1/64 inch to the inner surface of a mold having a length substantially less than the length of a side sheet; removably securing the mold and liner to an associated side sill and associated side plate member on one side of the railway car in spaced relation to but generally following the outer contour of the associated side sheet to form a compartment between the outer surface of the side sheet and the inner facing surface of the liner with the mold extending in a generally vertical direction between the associated side sill and associated side plate member; introducing polyurethane foam forming reactants into the compartment whereby the foam forming reactants fill the compartment; allowing the reactants to foam and harden to form an insulating layer of polyurethane foam on the outer surface of the side sheet; removing the mold from the side sill and top side plate member after the rigidizing of the polyurethane foam material with the inner liner adhering to the polyurethane foam material thereby to provide an exterior polyurethane foam layer of a uniform thickness and having a hard smooth outer surface covering, and then moving the mold along the length of the adjacent side sheet to another position for repeating the sequence of steps set forth above thereby to form the insulating polyurethane foam layer in adjacent sections.

6. A method according to claim 5 wherein the liner is made from a material selected from the group consisting of aluminum, steel and plastic.

* * * * *